(12) United States Patent
Miyahara et al.

(10) Patent No.: US 10,999,475 B2
(45) Date of Patent: May 4, 2021

(54) IMAGE FORMING APPARATUS AND IMAGE FORMING METHOD

(71) Applicant: KYOCERA Document Solutions Inc., Osaka (JP)

(72) Inventors: Norifumi Miyahara, Osaka (JP); Kunihiko Shimamoto, Osaka (JP); Satoshi Hayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/955,712

(22) PCT Filed: Oct. 12, 2018

(86) PCT No.: PCT/JP2018/038016
§ 371 (c)(1),
(2) Date: Jun. 18, 2020

(87) PCT Pub. No.: WO2019/123793
PCT Pub. Date: Jun. 27, 2019

(65) Prior Publication Data
US 2021/0075934 A1   Mar. 11, 2021

(30) Foreign Application Priority Data

Dec. 18, 2017  (JP) .............................. JP2017-242159
Feb. 16, 2018  (JP) .............................. JP2018-025823

(51) Int. Cl.
*H04N 1/54* (2006.01)
*H04N 1/00* (2006.01)

(52) U.S. Cl.
CPC ........... *H04N 1/54* (2013.01); *H04N 1/00005* (2013.01); *H04N 1/00037* (2013.01)

(58) Field of Classification Search
CPC .. H04N 1/54; H04N 1/00005; H04N 1/00037; H04N 1/405; B41J 2/525
See application file for complete search history.

(56) References Cited

U.S. PATENT DOCUMENTS

2013/0293930 A1   11/2013  Araki et al.

FOREIGN PATENT DOCUMENTS

JP    2001-218041 A    8/2001
JP    2006-254095 A    9/2006
(Continued)

*Primary Examiner* — Christopher Wait
(74) *Attorney, Agent, or Firm* — Hawaii Patent Services; Nathaniel K. Fedde; Kenton N. Fedde

(57) ABSTRACT

The occurrence of more and the deterioration of performance are suppressed. A data compression unit stores identification data indicating the presence or absence of periodicity, and printing data correlated with the identification data in a first memory area of a RAM. A color conversion processing unit that performs speculation processing stores printing data that has undergone color conversion processing corresponding to printing by a printer in a second memory area of the RAM. A screen processing unit that performs speculation processing performs AM screen processing on printing data. The screen processing unit confirms the identification data stored in the first memory area of the RAM by the data compression unit, and in a case where the identification data indicates there is periodicity, instructs to perform color conversion processing corresponding to printing by a copier on printing data, and performs FM screen processing on the printing data.

8 Claims, 4 Drawing Sheets

(56) References Cited

FOREIGN PATENT DOCUMENTS

| | | |
|---|---|---|
| JP | 2013-048371 A | 3/2013 |
| JP | 2013-236159 A | 11/2013 |

IMAGE FORMING APPARATUS AND IMAGE FORMING METHOD

TECHNICAL FIELD

The present invention relates to an image forming apparatus and image forming method suitable for an image forming process.

BACKGROUND ART

In an image forming apparatus such as a MFP Multifunction Peripheral), and the like, for example, a method of performing gradation representation of an image such as AM screen processing, which is amplitude modulation for reproducing halftones, or FM screen processing, which is a frequency modulation method, is used.

Incidentally, an AM screen represents gradation by changing the size of regularly arranged halftone dots, and is generally used for printing by a printer. On the other hand, an FM screen represents gradation in density of small halftone dots arranged in random, and generally, it is often used for printing by a copier.

Note that when an AM screen is used, although the shade of color may be represented by changing the size of halftone dots, interference fringes (hereinafter referred to as moire) may occur in an image due to the regularity of halftone dots. On the other hand, an FM screen does not have regularity in halftone dots, so although moire is not likely to occur, advanced techniques are required for managing minute halftone dots.

Here, as a technique for suppressing the occurrence of moire, Patent Literature 1 proposes an image forming apparatus that, when a reading unit reads an image of a document as document image data, a control unit switches the image processing method for image data to be overwritten onto the document based on the document image data.

CITED LITERATURE

Patent Literature

Patent Literature 1: JP 2013-236159 A

SUMMARY OF INVENTION

Technical Problem

In the image forming apparatus according to Patent Literature 1 described above, the control unit switches the image processing method for the image data to be overwritten onto the document based on the document image data, so a moire phenomenon that occurs when forming an image by overwriting onto the document may be suppressed.

However, in the image forming apparatus of Patent Literature 1, an image for overwriting is analyzed, divided into object units, and whether the divided object and the image of the document overlap is detected, and in a case where there is overlapping, image processing for the object is switched to image processing that differs from the image processing used for the image of the document, so there is a problem in that the performance of the image forming process may deteriorate.

Taking into consideration the situation described above, an object of the present invention is to provide an image forming apparatus and image forming method capable of eliminating the problems described above.

Solution to Problem

The image forming apparatus according to the present invention includes: an image processing unit that performs image processing on first printing data; a storage device for storing second printing data that has undergone image processing by the image processing unit; and a printer unit that performs printing based on the second printing data stored by the storage device; wherein the image processing unit has: a first data processing unit that converts the first printing data into bitmap third printing data; a second data processing unit that determines presence or absence of periodicity of an image corresponding to the third printing data; a color conversion processing unit that generates fourth printing data obtained by performing color conversion processing corresponding to printing by a printer on the third printing data by speculation processing in parallel with processing by the second data processing unit; a screen processing unit that performs AM screen processing on the fourth printing data by speculation processing in parallel with processing by the second data processing unit; and a data output unit that outputs printing data that has undergone screen processing by the screen processing unit as the second printing data to the printer unit; and in a case where the second data processing unit determines that the third printing data has periodicity, the screen processing unit instructs the color conversion processing unit to perform color conversion processing on the third printing data determined to have periodicity, and on all of the remaining third printing data following the third printing data determined to have periodicity so as to correspond to printing by a copier.

The image forming method according to the present invention is an image forming method executed by a computer that controls an image forming apparatus and having: a step of an image processing unit performing image processing on first printing data; a step of a storage device storing second printing data that has undergone image processing by the image processing unit; and a step of a printer unit performing printing based on the second printing data stored by the storage device; wherein the image processing unit further has: a step of a first data processing unit converting the first printing data to bitmap third printing data; a step of a second data processing unit determining presence or absence of periodicity of an image corresponding to the third printing data; a step of a color conversion processing unit performing speculation processing in parallel with processing by the second data processing unit and generating fourth printing data obtained by performing color conversion processing corresponding to printing by a printer on the third printing data; a step of a screen processing unit performing speculation processing in parallel with processing by the second data processing unit and performing AM screen processing on the fourth printing data; and a step of a data output unit outputting printing data that has undergone screen processing by the screen processing unit as the second printing data to the printer unit; wherein the screen processing unit, in a case where the second data processing unit determines that the third printing data has periodicity, instructs the color conversion processing unit to perform color conversion processing on the third printing data determined to have periodicity, and on all of the remaining third printing data following the third printing data determined to have periodicity so as to correspond to printing by a copier.

Advantageous Effect of Invention

With the image forming apparatus and the image forming method according to the present invention, color conversion processing by a color conversion processing unit may be fixed to correspond to printing by a copier, so deterioration of the performance of an image forming process may be suppressed while suppressing both the occurrence of moire and variation in image quality (appearance of a printed image).

DESCRIPTION OF EMBODIMENTS

In the following, an embodiment of the image forming apparatus according to the present invention will be described with reference to FIGS. 1 to 4. Note that an example of the image forming apparatus in the following description is a MFP Multifunction Peripheral), for example, which is a complex peripheral apparatus equipped with a print function, a copy function, a FAX function, a data transmission/reception function via a network, and the like.

Figure 1:
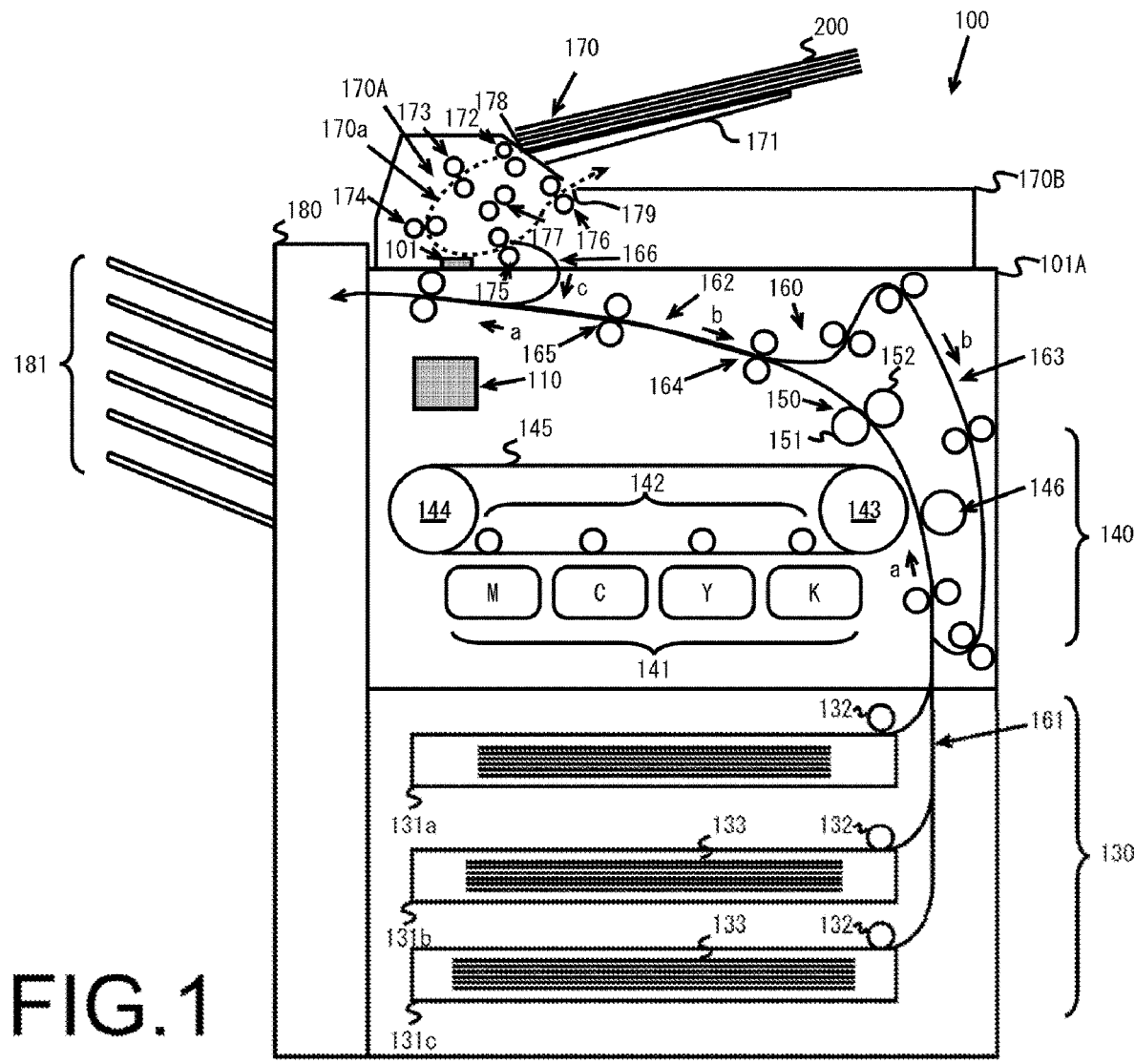
FIG. 1 is a diagram for describing an embodiment in a case where an image forming apparatus according to the present invention is applied to an MFP.

First, as illustrated in FIG. 1, a scanner unit 101, a control unit 110, a paper supply unit 130, a printer unit 140, a fixing unit 150, a conveying unit 160, and the like are mounted inside the main body 101A of an MFP 100. Incidentally, reference number 170 denotes an ADF (Auto Document Feeder) having a paper supply tray 171, and reference number 180 denotes a mailbox having a plurality of paper discharge trays 181.

Although details will be described later, the scanner unit 101 reads, for example, images on the front side and the back side of, for example, a printed sheet of paper 200 that is automatically fed from the ADF 170. In addition, the printed sheet of paper 200 may be stored, for example, in the lower paper supply cassette 131c and may be fed from the paper supply cassette 131c. In this case, the scanner unit 101 reads an image on the front side of the printed sheet of paper 200 that is conveyed by a first conveying path 161 described later and further conveyed by a second conveying path 162, and then reads an image on the back side of the printed sheet of paper 200 that is reversed by a third conveying path 163.

The control unit 110 controls the operation of each unit, and the details will be described later. The paper supply unit 130 stores a plurality of paper supply cassettes 131a to 131c that can store various sheets of paper 133 having different sheet sizes and sheet types. Incidentally, the paper supply cassettes 131a to 131c, for example, may be such that the lower paper supply cassette 131c is set for the printed sheets of paper 200, and the upper paper supply cassette 131a and the middle paper supply cassette 131b are set for the blank sheets of paper 133. In addition, paper supply rollers 132 are provided for the respective paper supply cassettes 131a to 131c. The paper supply rollers 132 feed the sheets of paper 133 from the paper supply cassettes 131a to 131c to the first conveying path 161 described later of the conveying unit 160.

The printer unit 140 includes an image forming unit 141 that has a photosensitive drum, a developing device, a charging device, an exposing device, and the like (not illustrated), and includes magenta (M), cyan (C), yellow (Y), and black (K). In addition, the printer unit 140 has a primary transfer roller 142, a driving roller 143, a following roller 144, an intermediate transfer belt 145, and a secondary transfer roller 146. The image forming unit 141 forms a toner image on a photosensitive drum (not illustrated) in processes of charging, exposing and developing based on printing data. Moreover, the primary transfer roller 142 transfers the toner image on the photosensitive drum (not illustrated) onto the intermediate transfer belt 145 that extends between the driving roller 143 and the following roller 44. The secondary transfer roller 146 is in pressure contact with the back surface side of the sheet of paper 133 and transfers the toner image on the intermediate transfer belt 145 to the front surface side of the sheet of paper 133.

The fixing unit 150 has a heating roller 151 and a pressure roller 152. The heating roller 151 applies heat from a heat source controlled by a heat source control unit (not illustrated) to the sheet of paper 133. The pressure roller 152 presses the sheet of paper 133 toward the heating roller 151 side. The pressing force of the pressure roller 152 is adjusted by a pressure adjusting mechanism unit (not illustrated). Then, the fixing unit 150 applies the pressure by the pressure roller 152 and the heat by the heating roller 151 to the sheet of paper 133 on which the toner image is transferred by the driving roller 143 and the secondary transfer roller 146. As a result, the toner image is fixed to the sheet of paper 133. Note that the pressure adjusting mechanism unit (not illustrated) includes a driving unit such as a pressing member, a spring, a stepping motor or the like for pressing the pressure roller 152 in the direction of the heating roller 151, and adjusts the pressing force of the pressure roller 152 by operating the driving unit and moving the pressing member.

The conveying unit 160 has a first conveying path 161 extending from the paper supply cassettes 131a to 131c to a branch point 164, a second conveying path 162 extending from the branch point 164 to a mailbox 180, a third conveying path 163 going around the branch point 164 and returning to the first conveying path 161, and a fourth conveying path 166 extending from the ADF 170 to the second conveying path 162. Incidentally, the first conveying path 161 and the second conveying path 162 are used for single-sided printing. In addition, the third conveying path 163 is used for double-sided printing.

Here, in single-sided printing, the first conveying path 161 conveys the sheet of paper 133 along the direction of arrow a to the transfer position of the toner image of the printer unit 140, and conveys the sheet of paper 133 to the fixing unit 150 side in accordance with the transfer speed of the toner image. Furthermore, the first conveying path 161 conveys the sheet of paper 133 to the toner image fixing position of the fixing unit 150, and then conveys the sheet of paper 133 that has been fixed to the second conveying path 162 side. Then, the second conveying path 162 conveys the sheet of paper 133 on which the toner image is fixed to the mailbox 180 side along the arrow a direction.

In double-sided printing, the first conveying path 161 conveys the sheet of paper 133 along the direction of arrow a to the transfer position of the toner image of the printer unit 140, and then conveys the sheet of paper 133 to the fixing unit 150 side in accordance with the transfer speed of the toner image. Furthermore, the first conveying path 161 conveys the sheet of paper 133 to the toner image fixing position of the fixing unit 150, and then conveys the sheet of paper 133 that has been fixed to the second conveying path 162 side. Continuing, the second conveying path 162 conveys the sheet of paper 133 on which the toner image is fixed along the direction of the arrow a to the mailbox 180 side, however, when the trailing end of the sheet of paper 133 reaches the branch point 164, the third conveying path 163 conveys the sheet of paper 133 along the direction of the arrow b and feeds the sheet of paper 133 to the first conveying path 161. At this time, the sheet of paper 133 is reversed (the back side on which an image is not formed is faced toward the intermediate transfer belt 145 side). After that, as in the case of single-sided printing, the second conveying path 162 conveys the sheet of paper 133 on which the toner image has been transferred and fixed along the direction of the arrow a to the mailbox 180 side. In the case of both single-sided printing and double-sided printing, it is possible to select one of the paper supply cassettes 131a to 131c in which blank sheets of paper 133 are stored.

The ADF 170 has a plurality of conveying rollers 172 to 177 that are arranged inside the main body 170B. In addition, the main body 170B is provided with a paper supply port 178 and a discharge port 179. A plurality of, for example, printed sheets of paper 200 may be set in the paper supply tray 171. Moreover, for example, printed sheets of paper 200 that are set in the paper supply tray 171 are separated one by one by a separating mechanism (not illustrated). Incidentally, a soccer type mechanism, a friction type mechanism, or the like may be used as a separating mechanism.

The conveying rollers 172 to 176 are arranged along the conveying path 170a of the printed sheet of paper 200 indicated by the dotted line, for example. The conveying rollers 177 is arranged, for example, along the conveying path (not illustrated) of the printed sheet of paper 200 indicated by a dotted line. In addition, for example, the printed sheet of paper 200 conveyed along the conveying path (not illustrated) is conveyed along the fourth conveying path 166 and then conveyed to the second conveying path 162 side. Here, the switchback mechanism 170A is configured by conveying rollers 176, 177, 173. Note that the arrangement of the conveying rollers 172 to 177 differs for each model, and may be arbitrarily changed. Moreover, the switchback mechanism 170A by the conveying rollers 176, 177, 173 is also different for each model, and may be arbitrarily changed.

According to control by the control unit 110, the mailbox 180 performs sorting of the printed sheets of paper 200, for example, to the paper discharge tray 181 specified according to the size of the margin of the sheet of paper 200.

Figure 2:
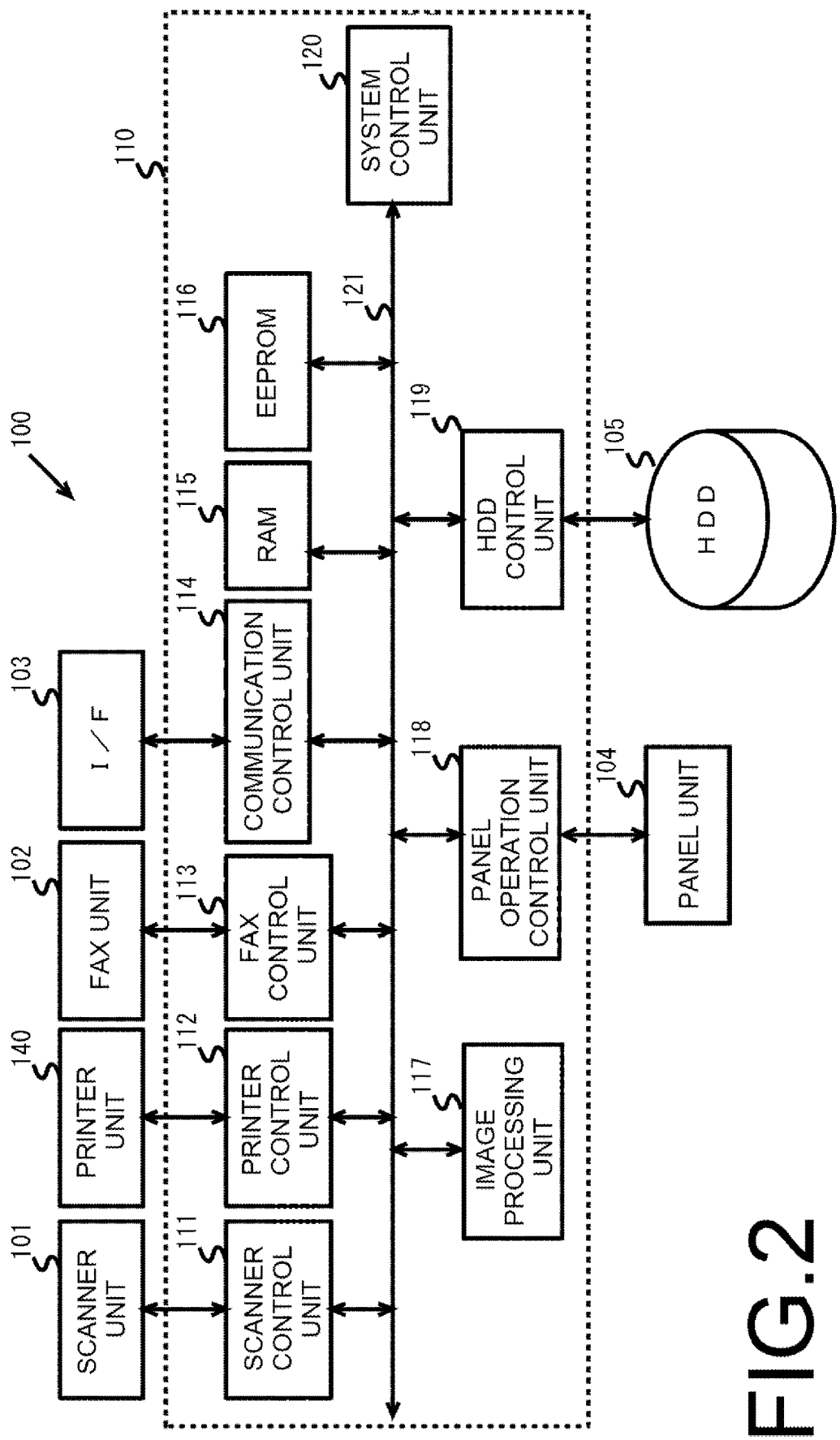
FIG. 2 is a diagram for describing a configuration of the MFP in FIG. 1.

Next, the configuration of the control unit 110 in FIG. 1 will be described with reference to FIG. 2. A control unit 110 controls the operation of a scanner unit 101, a printer unit 140, a FAX (facsimile) unit 102, an I/F (interface) 103, a panel unit 104, and a HDD 105.

The scanner unit 101 is a device that converts, for example, an image on a printed sheet of paper 200 read by an image sensor (not illustrated) into digital image data and inputs the digital image data to the control unit 110. The printer unit 140 is a device that prints an image on a blank sheet of paper 133 or the like based on printing data that is outputted from the control unit 110. The FAX unit 102 is a device that transmits data that is outputted from the control unit 110 to a facsimile of another party via a telephone line, and receives data from the facsimile of another party, and inputs that data to the control unit 110.

The I/F 103 is in charge of communication with other MFPs 100, user terminals and the like via a network. Note that the I/F 103 may also be in charge of communication with a content server, a web server, and the like (not illustrated). The panel unit 104 is a device having a touch panel and hardware key for performing, for example, a print function, a copy function, a FAX function, a data transmission/reception function via a network, and for displaying various settings of the MFP 100. The HDD 105 is a storage device for storing application programs and the like for providing various functions of the MFP 100. Also, the HDD 105 has a user box for storing printing jobs registered from the user terminal side.

The control unit 110 is a processor that executes an application program such as an authentication program or the like, an image forming program, a control program, and the like to control the overall operation of the MFP 100. The control unit 110 includes a scanner control unit 111, a printer control unit 112, a FAX control unit 113, a communication control unit 114, a RAM (random access memory) 115, an EEPROM (electrically erasable and programmable read-only memory) 116, an image processing unit 117, a panel operation control unit 118, an HDD control unit 119, and a system control unit 120. Also, these units are connected to a data bus 121.

The scanner control unit 111 controls the reading operation of the scanner unit 101. The printer control unit 112 controls the printing operation of the printer unit 140. The fax control unit 113 controls the data transmission and reception operation by the FAX unit 102. The communication control unit 114, via the I/F 103, performs control of transmission and reception of data and the like via a network. The RAM 115 is a work memory for executing a program. In addition, the RAM 115 is a storage device for storing printing data that has undergone screen processing or image processing (rasterizing) (described later) by the image processing unit 117. The EEPROM 116 stores a control program or the like for generating an operation check or startup sequence for each unit.

The image processing unit 117 performs image processing (rasterizing, screen processing, and the like) on the image data read by the scanner unit 101, the details of which will be described later. In addition, the image processing unit 117 also performs image processing (rasterizing, screen processing, and the like) on a printing job registered in the user box of the HDD 105. Incidentally, the system control unit 120 causes the RAM 115 to temporarily store printing data that has undergone image processing (rasterizing, screen processing, and the like) by the image processing unit 117. The panel operation control unit 118 controls the display operation of the panel unit 104. Moreover, the panel operation control unit 118 receives an instruction such as a setting or the like via panel unit 104.

The HDD control unit 119 controls reading data from and writing data to the HDD 105, and the like. The system control unit 120 controls cooperative operation or the like of each unit. Furthermore, for example, when there is a printing instruction via the panel unit 104, the system control unit 120 instructs the image processing unit 117 and the printer control unit 112 to print.

Figure 3:
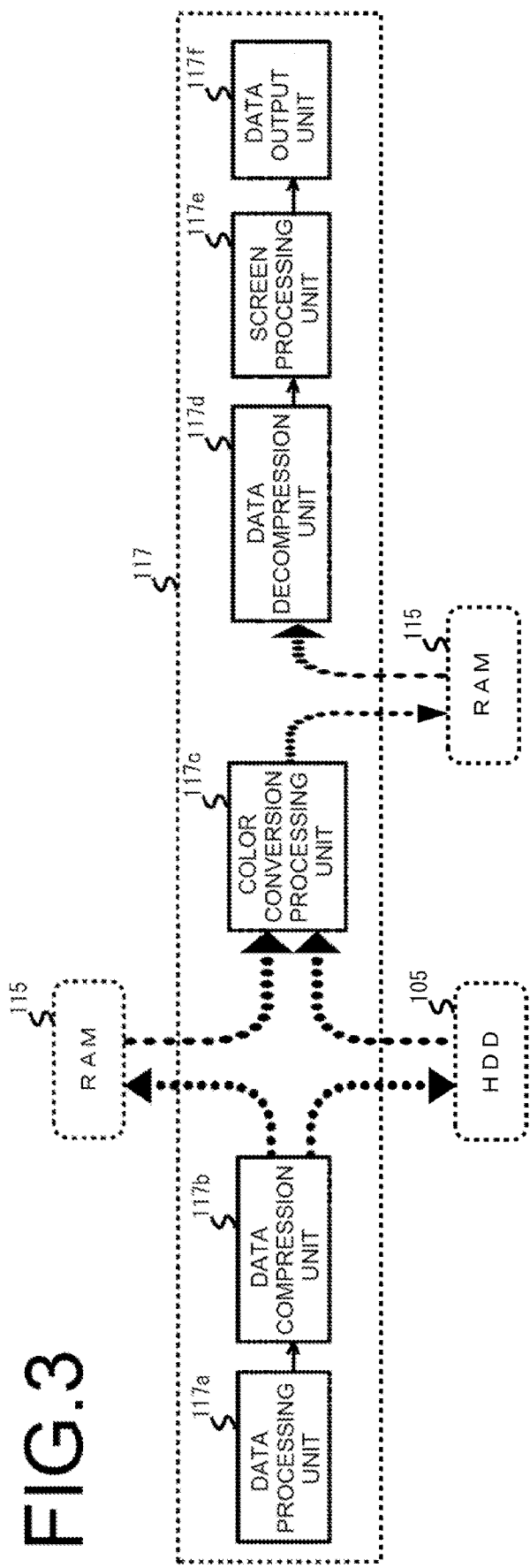
FIG. 3 is a diagram for describing an example of the configuration of the image processing unit in FIG. 2.

Next, an example of the configuration of the image processing unit 117 will be described with reference to FIG. 3. Note that in image processing by the image processing unit 117, AM screen processing, which is amplitude modulation, or FM screen processing, which is a frequency modulation method, is executed in order to reproduce halftones. Incidentally, an AM screen represents gradation by changing the size of regularly arranged dots, and generally is often used for printing by a printer. On the other hand, an FM screen represents gradation in density of small dots arranged in random, and generally is often used for printing by a copier. In the following, the image processing unit 117 is basically described as performing screen processing using an AM screen for printing by a printer. Moreover, printing data processed by a data processing unit 117a described below is, for example, an intermediate language of which printing information indicated by PDL (Page Description Language) is analyzed. Furthermore, a color conversion processing unit 117c, a data decompression unit 117d, and a screen processing unit 117e that are described below execute speculation processing in parallel with the processing by the data processing unit 117a and the data compression unit 117b, and the respective processing by these will be described in order.

First, the image processing unit 117 has a data processing unit 117a, a data compression unit 117b, a color conversion processing unit 117c, a data decompression unit 117d, a screen processing unit 117e, and a data output unit 117f.

The data processing unit 117a converts, for example, printing data including characters, images, and the like expressed in an intermediate language into bitmap printing data. The data compression unit 117b compresses the printing data converted by the data processing unit 117a and stores that printing data in a first memory area of the RAM 115 and the HDD 105. Incidentally, the printing data stored in the first memory area of the RAM 115 will be described in detail later, however when it becomes necessary to switch from the AM screen to the FM screen by the screen processing unit 117e in a later stage, the printing data is read by the color processing unit 117c in a later stage and undergoes color conversion processing. On the other hand, in a case, for example, where printing data that requires re-color conversion processing by the color conversion processing unit 117c is not stored in the first memory area of the RAM 115, the printing data that is stored in the first memory area of the RAM 115 is read by the color conversion processing unit 117c in a later stage and undergoes color conversion processing.

In addition, the data compression unit 117b analyzes whether or not an image corresponding to the compressed printing data for each page has periodicity, and correlates identification data indicating the presence or absence of periodicity with the respective printing data for each page. Here, the periodicity of the data may be analyzed based on the arrangement of pixels based on the bitmap data that is processed by the data processing unit 117a, or based on the arrangement of pixels based on specific bitmap data such as hatching or the like. Moreover, the data compression unit 117b stores the identification data that is correlated with the respective printing data for each page in the first memory area of the RAM 115 and the HDD 105.

Here, the color conversion processing unit 117c, the data decompression unit 117d, and the screen processing unit 117e execute speculation processing in parallel with the processing by the data processing unit 117a and the data compression unit 117b. In other words, the color conversion processing unit 117c reads one page of printing data compressed by the data compression unit 117b from the first memory area of the RAM 115 and decompresses that printing data into bitmap printing data, then executes color conversion processing on that bitmap printing data. At this time, in a case of printing by a printer, the color conversion processing unit 117c executes color conversion processing using a printer color table as color conversion processing that corresponds to printing by a printer. Moreover, the color conversion processing unit 117c compresses the printing data that has undergone color conversion processing, and stores the compressed printing data in a second memory area of the RAM 115. Note that when it becomes necessary to switch from the AM screen to the FM screen by the screen processing unit 117e in a later stage, the color conversion processing unit 117c reads the printing data stored in the first memory area of the RAM 115 by the data compression unit 117b, and performs color conversion processing using a copier color table as color conversion processing that corresponds to printing by a copier, compresses the printing data that has undergone color conversion processing, and stores the compressed printing data in the second memory area of the RAM 115.

The data decompression unit 117d reads printing data, which has been color conversion processed and compressed, from the second memory area of the RAM 115, and then decompresses it. The screen processing unit 117e performs screen processing on the color converted printing data decompressed by the data decompression unit 117d. Here, the screen processing unit 117e executes screen processing on the color converted printing data decompressed by the data decompression unit 117d using an AM screen. In addition, the screen processing unit 117e confirms identification data indicating the presence or absence of periodicity correlated with the compressed one page of data stored in the first memory area of the RAM 115 by the data compression unit 117b. When the screen processing unit 117e confirms that there is no periodicity, the screen processing unit 117e sends the printing data that has been screen-processed by the AM screen to the data output unit 117f in a later stage.

On the other hand, when the screen processing unit 117e confirms that there is periodicity, the screen processing unit 117e instructs the color conversion processing unit 117c to perform re-color conversion processing. At this time, the screen processing unit 117e instructs the color conversion processing unit 117c to perform the same color conversion processing as the re-color conversion processing on all the subsequent remaining printing data. As a result, in the case of printing by a printer, the color conversion processing unit 117c switches the color conversion processing using a printer color table to the color conversion processing using a copier color table. Moreover, the color conversion processing unit 117c executes color conversion processing using the copier color table on the printing data for which re-color conversion processing is instructed and all of the printing data following that printing data.

In this case, the screen processing unit 117e deletes the printing data that has undergone screen processing by the AM screen. In addition, the screen processing unit 117e performs screen processing using an FM screen on the printing data on which the color conversion processing unit 117c has performed re-color conversion processing. Then, the screen processing unit 117e sends the printing data that has been screen-processed by an FM screen to the data output unit 117f in a later stage. Note that when the color conversion processing unit 117c performs re-color conversion processing, since re-color conversion processing being also the same color conversion processing, for the printing data, after color conversion processing, so the screen processing unit 117e performs screen processing using a FM screen until reaching the final printing data. The data output unit 117f performs processing such as enlargement/reduction, rotation, and the like on the printing data that has undergone screen processing by the screen processing unit 117e to convert the printing data into the final drawing data and outputs the printing data. Note that the screen processing unit 117e may perform confirmation of the identification data in the middle of screen processing.

In addition, when it is confirmed that there is periodicity, the screen processing unit 117e may instruct the data compression unit 117b to stop the process of analyzing whether or not there is periodicity in images corresponding to compressed printing data for each page. In this case, the analysis process by the data compression unit 117b is omitted, so the processing time by the data compression unit 117b may be shortened.

Figure 4:
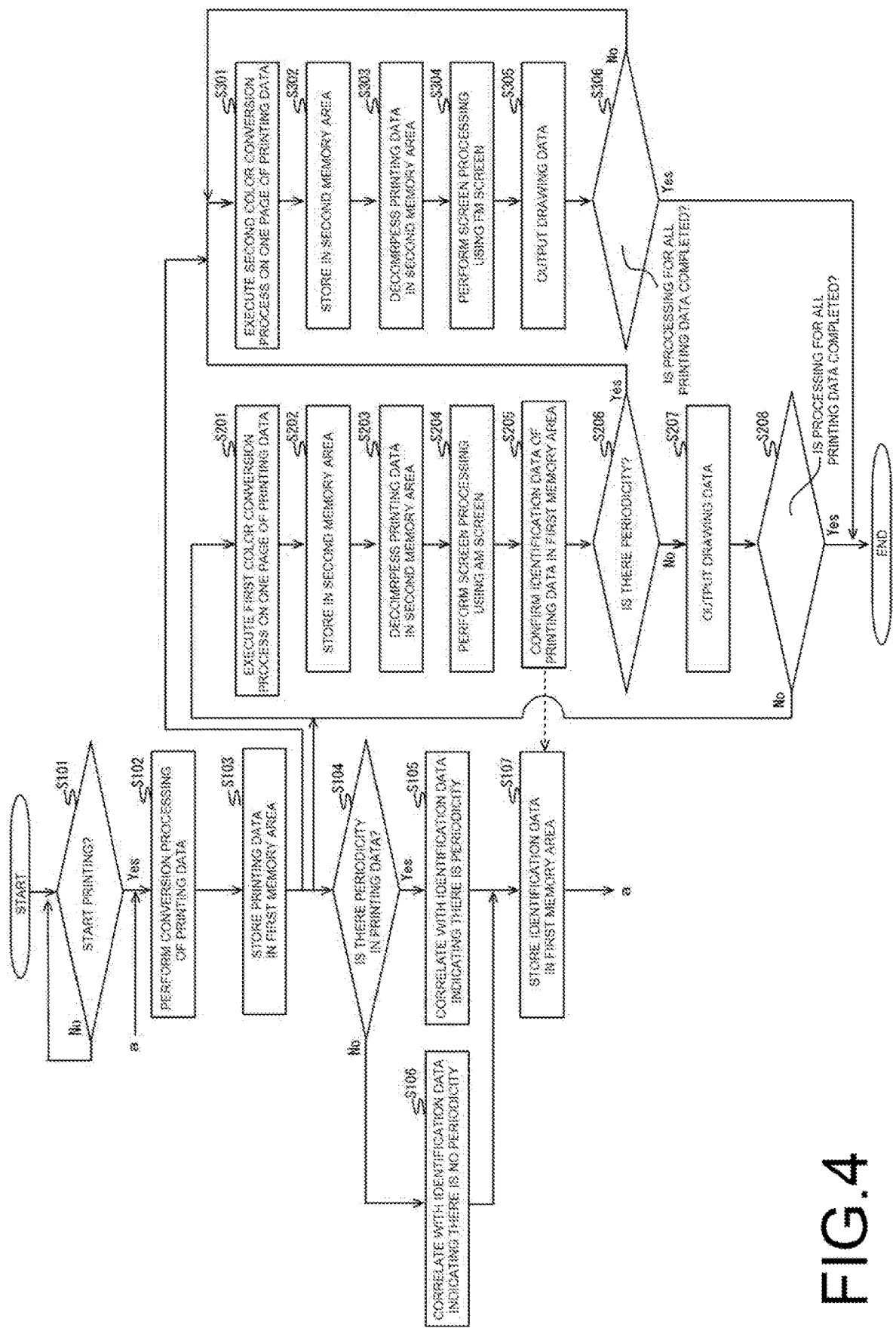
FIG. 4 is a flowchart for describing an example of image processing by the MFP in FIG. 1.

Next, an example of image processing by the MFP 100 will be described with reference to FIG. 4. Incidentally, in the following, the image processing unit 117 is described as performing screen processing using an AM screen for printing by a printer. In addition, in the following, the processes of steps S201 to S208 and steps S301 to S306 indicate speculation processing that is performed in parallel with the process of steps S102 to S107. Moreover, in the following, steps S201 to S208 are a process that is executed when there is no periodicity in the printing data. On the other hand, steps S301 to S306 are a process that is executed when there is periodicity in the printing data. Furthermore, steps S301 to S306 are a process that is executed for all printing data following printing data having periodicity regardless of the presence or absence of periodicity.

<Processing by the Data Processing Unit 117a and Data Compression Unit 117b>

(Step S101)

The system control unit 120 determines whether or not printing is started.

In this case, when there is no notification from the panel operation control unit 118 via the panel unit 104 indicating that starting printing has been selected, the system control unit 120 determines that printing is not started (step S101: NO).

On the other hand, when there is a notification from the panel operation control unit 118 via the panel unit 104 indicating that starting printing has been selected, the system control unit 120 determines that printing is started (step S101: YES), and processing moves to step S102.

Note that when the system control unit 120 determines that printing is started, the system control unit 120 instructs the image processing unit 117 and the printer control unit 112 to start printing. In addition, in a case where the printing data selected via the panel unit 104 is stored in the HDD 105, the system control unit 120 reads the corresponding printing data from the HDD 105 and gives it to the image processing unit 117.

(Step S102)

The data processing unit 117a of the image processing unit 117 performs conversion processing of printing data.

In this case, the data processing unit 117a, for example, rasterizes and converts printing data including characters, images, and the like expressed in an intermediate language into bitmap printing data. Note that the data processing unit 117a performs conversion processing of printing data for each page.

(Step S103)

The data compression unit 117b of the image processing unit 117 stores the printing data in the first memory area of the RAM 115 and the HDD 105.

In this case, the data compression unit 117b compresses one page of printing data converted by the data processing unit 117a, and stores the compressed one page of printing data in the first memory area of the RAM 115 and the HDD 105.

(Step S104)

The data compression unit 117b of the image processing unit 117 analyzes the compressed printing data stored in the first memory area of the RAM 115, and determines whether or not there is periodicity in an image corresponding to the one page of printing data converted by the data processing unit 117a.

In this case, when the data compression unit 117b determines that the image corresponding to the one page of printing data converted by the data processing unit 117a has periodicity (step S104: YES), processing moves to step S105.

On the other hand, when the data compression unit 117b determines that the image corresponding to the one page of printing data converted by the data processing unit 117a does not have periodicity (step S104: NO), processing moves to step S106.

(Step S105)

The data compression unit 117b of the image processing unit 117 generates identification data indicating that there is periodicity and correlates the generated identification data with the compressed one page of printing data.

(Step S106)

The data compression unit 117b of the image processing unit 117 generates identification data indicating that there is no periodicity and correlates the generated identification data with the compressed one page of printing data. Here, the identification data may be correlated with the printing data by including the identification information of the printing data to be correlated and code indicating the presence or absence of the periodicity in identification data indicating the presence or absence of periodicity.

(Step S107)

The data compression unit 117b of the image processing unit 117 stores the identification data in the first memory area of the RAM 115 and the HDD 105.

Processing by the Color Conversion Processing Unit 117c, Data Decompression Unit 117d, Screen Processing Unit 117e, and Data Output Unit 117f when there is No Periodicity>

(Step S201)

The color conversion processing unit 117c of the image processing unit 117 executes first color conversion processing (color conversion processing using a printer color table) on one page of printing data.

In this case, after the process of step S103 ends, the color conversion processing unit 117c reads one page of compressed printing data from the first memory area of the RAM 115 and decompresses that printing data into bitmap printing data, then executes color conversion processing on that bitmap printing data. At this time, the color conversion processing unit 117c executes color conversion processing using the printer color table.

(Step S202)

The color conversion processing unit 117c of the image processing unit 117 stores the one page of printing data that has undergone color conversion processing in a second memory area of the RAM 115.

In this case, the color conversion processing unit 117c compresses the one page of printing data that has undergone color conversion processing using the printer color table, and stores the compressed printing data in the second memory area of the RAM 115.

(Step S203)

The data decompression unit 117d of the image processing unit 117 reads the one page of printing data that has undergone color conversion processing from the second memory area of the RAM 115 and decompresses it.

(Step S204)

The screen processing unit 117e of the image processing unit 117 performs screen processing using an AM screen.

In this case, the screen processing unit 117e performs screen processing using an AM screen on the printing data that has undergone color conversion processing and that has been decompressed by the data decompression unit 117d.

Incidentally, steps S201 to S204 and steps S104 to S107 are executed independently of each other.

(Step S205)

The screen processing unit 117e of the image processing unit 117 confirms the identification data of the printing data in the first memory area of the RAM 115.

In this case, after the screen processing unit 117e completes the screen processing on the printing data that has undergone color conversion processing and that is decompressed by the data decompression unit 117d, the screen processing unit 117e confirms the identification data corresponding to the printing data that has undergone color conversion processing as the target of screen processing in step S204 and that is correlated with the compress one page of data stored in the first memory area of the RAM 115 by the data compression unit 117b. Note that the screen processing unit 117e may perform confirmation of identification data during a series of processes of step S201 to step S204 (for example, periodically and/or each time each step of step S201 to S204 is completed).

(Step S206)

The screen processing unit 117e of the image processing unit 117 determines whether or not there is periodicity.

In this case, when the screen processing unit 117e confirms the identification data correlated with the compressed one page of data stored in the first memory area of the RAM 115 by the data compression unit 117b, and determines that the identification data indicates that there is no periodicity (step S206: NO), processing moves to step S207. At this time, the screen processing unit 117e sends the printing data that has undergone screen processing using an AM screen to the data output unit 117f in a later stage.

However, when the screen processing unit 117e confirms the identification data correlated with the compressed one page of data stored in the first memory area of the RAM 115 by the data compression unit 117b, and determines that the identification data indicates that there is periodicity (step S206: YES), processing moves to step S301.

At this time, the screen processing unit 117e instructs the color conversion processing unit 117c to perform re-color conversion processing. In addition, the screen processing unit 117e also instructs the color conversion processing unit 117c to perform color conversion processing that is the same as the re-color conversion processing on the subsequent printing data that follows the printing data for which re-color conversion processing is instructed. Moreover, the screen processing unit 117e deletes the printing data that has undergone screen processing using the AM screen.

Note that when the identification data correlated with the compressed one page of data cannot be confirmed, the screen processing unit 117e waits until the identification data is stored in the first memory of the RAM 115.

In addition, when it is confirmed that there is periodicity, the screen processing unit 117e may instruct the data compression unit 117b to stop the process of analyzing whether or not there is periodicity in images corresponding to compressed printing data for each page. In this case, the analysis process by the data compression unit 117b is omitted, so the processing time by the data compression unit 117b may be shortened.

(Step S207)

The data output unit 117f of the image processing unit 117 converts the printing data that has undergone screen processing by the screen processing unit 117e into final drawing data and outputs the data.

(Step S208)

The image processing unit 117 determines whether or not the processing for all printing data has been completed.

Here, when the image processing unit 117 determines that the processing for all printing data is not completed (step S208: NO), processing moves to step S201.

On the other hand, when the image processing unit 117 determines that the processing for all printing data is completed (step S208: YES), processing ends.

<Processing by the Color Conversion Processing Unit 117c, Data Decompression Unit 117d, Screen Processing Unit 117e, and Data Output Unit 117f when there is Periodicity>

(Step S301)

The color conversion processing unit 117c of the image processing unit 117 executes second color conversion processing (color conversion processing using a copier color table) on one page of printing data.

In this case, the color conversion processing unit 117c reads one page of compressed printing data from the first memory area of the RAM 115 and decompresses that printing data into bitmap printing data, then executes color conversion processing on that bitmap printing data. At this time, the color conversion processing unit 117c executes color conversion processing using the copier color table.

(Step S302)

The color conversion processing unit 117c of the image processing unit 117 stores the one page of printing data that has undergone color conversion processing in a second memory area of the RAM 115.

In this case, the color conversion processing unit 117c compresses the one page of printing data that has undergone color conversion processing using the copier color table, and stores the compressed printing data in the second memory area of the RAM 115.

(Step S303)

The data decompression unit 117d of the image processing unit 117 reads the one page of printing data that has undergone color conversion processing from the second memory area of the RAM 115 and decompresses it.

(Step S304)

The screen processing unit 117e of the image processing unit 117 performs screen processing using a FM screen.

In this case, the screen processing unit 117e performs screen processing using a FM screen on the printing data that has undergone color conversion processing and that has been decompressed by the data decompression unit 117d.

(Step S305)

The data output unit 117f of the image processing unit 117 converts the printing data that has undergone screen processing by the screen processing unit 117e into final drawing data and outputs the data.

(Step S306)

The image processing unit 117 determines whether or not the processing for all printing data has been completed.

Here, when the image processing unit 117 determines that the processing for all printing data is not completed (step S306: NO), processing moves to step S301.

On the other hand, when the image processing unit 117 determines that the processing for all printing data is completed (step S306: YES), processing ends.

Incidentally, in a case where the processing for all printing data is not completed in step S306, the color conversion processing unit 117c of the image processing unit 117, in step S301, reads the compressed one page of printing data from the first memory area of the RAM 115, decompresses the read data into bitmap printing data, and executes color conversion processing on that bitmap printing data. At this time, the color conversion processing unit 117c executes color conversion processing using the copier color table.

Hereinafter, in a case where the processing for all printing data is not completed in step S306, the color conversion processing unit 117c of the image processing unit 117, in the same way as described above, reads compressed one page of printing data from the first memory area of the RAM 115 and executes color conversion processing using a copier color table until the processing for all printing data is completed.

Note that when the image processing unit 117 determines that processing for all printing data is not completed (step S306: NO) after the processing of steps S301 to S305 only in the case where it is determined that there is periodicity in the first page of data compressed by the data compression unit 117b (step S206: YES), processing moves to step S301. In this case, when the image processing unit 117 determines that processing for all printing data is not completed (step S306: NO) after the processing of steps S301 to S305 in the case where it is determined that there is periodicity in the second or the following page of data compressed by the data compression unit 117b (step S206: YES), processing may move to step S201.

As described above, in the present embodiment, the image processing unit 117 performs image processing on printing data (first printing data), the RAM 115 (storage device) stores the printing data (second printing data) that has undergone image processing by the image processing unit 117, and the printer unit 140 performs printing based on the printing data (second printing data) that is stored by the storage device. In addition, in the image processing unit 117, the data processing unit 117a (first data processing unit) converts printing data (first printing data) to bitmap printing data (third printing data), the data compression unit 117b (second data processing unit) stores identification data indicating the presence or absence of periodicity that is obtained by analyzing the printing data (third printing data) in a first memory area and correlates the identification data with the printing data (third printing data), the color conversion processing unit 117c that performs speculation processing in parallel with processing by the data compression unit 117b (second data processing unit) stores printing data (fourth printing data) that is the result of performing color conversion processing corresponding to printing by a printer on the printing data (third printing data) in a second memory area of the RAM 115 (storage device), the screen processing unit 117e that performs speculation processing in parallel with processing by the data compression unit 117b (second data processing unit) performs AM screen processing on the printing data (fourth printing data), and the data output unit 117f converts the printing data that has undergone screen processing by the screen processing unit 117e to final drawing data, and outputs that data as printing data (second printing data). Moreover, the screen processing unit 117e confirms the identification data stored in the first memory area of the RAM 115 (storage device) by the data compression unit 117b (second data processing unit), and in a case where the identification data is indicated as having periodicity, instructs the color conversion processing unit 117c to perform color conversion processing corresponding to printing by a copier on the printing data (third printing data), and performs FM screen processing on the printing data that has undergone color conversion processing corresponding to printing by a copier.

As described above, by performing speculation processing of color conversion processing by the color conversion processing unit 117c and screen processing by the screen processing unit 117e in parallel with a process of analyzing printing data (third printing data) that is converted by the data processing unit 117a (first data processing unit) by the data compression unit 117b (second data processing unit), screen processing can be executed simultaneously with a process of analyzing printing data (third printing data) by the data compression unit 117b (second data processing unit), and color conversion process corresponding to printing by a copier by the color conversion processing unit 117c for suppressing the occurrence of moire may be executed on the same printing data (third printing data) that has undergone color conversion processing corresponding to printing by a printer, so a deterioration of performance of the image forming process may be suppressed while suppressing the occurrence of moire.

Incidentally, in a case where the screen processing unit 117e performs confirmation of identification data in step 205 during the series of processes of step S201 to step S204: (1) when it is indicated that identification data correlated with the compressed one page of printing data does not have periodicity, the data compression unit 117b may delete the compressed one page of printing data from the first memory area of the RAM 115 after color conversion processing is completed in step S201, and (2) when it is indicated that identification data correlated with the compressed one page of printing data has periodicity, the data compression unit 117b may delete the compressed one page of printing data from the first memory area of the RAM 115 after color conversion processing is completed in step S209.

In addition, in a case where the screen processing unit 117e confirms the identification data in step S205 during the series of processes in steps S201 to S204, when it is indicated that the identification data correlated with the compressed one page of printing data has periodicity, the process being executed among steps S201 to S204 may be stopped, and the processing may move to step S205.

Moreover, in step S104, in a case where the data compression unit 117b determines that the one page of printing data converted by the data processing unit 117a has periodicity, the data compression unit 117b may instruct the processing unit (the color conversion unit 117c or the screen processing unit 117d) that is currently executing the processing among steps S201 to S204 to stop the processing, the processing unit receiving the instruction may stop the processing being executed, and processing may move to step S209. In this case, the processing of step S105 to step S107 may be deleted from the processing flow.

In addition, in step S104, the data compression unit 117b of the image processing unit 117 may analyze the compressed printing data stored in the first memory area of the HDD 105. In this case, regardless of the identification data confirmation process in step S205, the data compression unit 117b may delete the compressed one page of printing data from the first memory area of the RAM 115 after the color conversion processing in step S201 is completed. Here, in step S209, the color conversion processing unit 117c may read the compressed one page of printing data from the first memory area of the HDD 105 and execute the color conversion processing.

In addition, in step S205, the screen processing unit 117*e* may confirm the identification data of the printing data in the first memory area of the HDD 105.

Moreover, in step S107, the data compression unit 117*b* may store the identification data in one preset first memory area of either the RAM 115 or the HDD 105. In this case, in step S205, the screen processing unit 117*e* confirms the identification data of the printing data of the first memory area of the storage device, either the RAM 115 or the HDD 105, in which the identification data is stored.

Furthermore, as described above, in the present embodiment, the image processing unit 117 performs image processing on printing data (first printing data), the RAM 115 (storage device) stores the printing data (second printing data) that has undergone image processing by the image processing unit 117, and the printer unit 140 performs printing based on the printing data (second printing data) that is stored by the storage device. In addition, in the image processing unit 117, the data processing unit 117*a* (first data processing unit) converts printing data (first printing data) to bitmap printing data (third printing data), the data compression unit 117*b* (second data processing unit) stores identification data indicating the presence or absence of periodicity that is obtained by analyzing the printing data (third printing data) in a first memory area of the RAM 115 (storage device) and correlates the identification data with the printing data (third printing data), the color conversion processing unit 117*c* that performs speculation processing in parallel with processing by the data compression unit 117*b* (second data processing unit) stores printing data (fourth printing data) that is the result of performing color conversion processing corresponding to printing by a printer on the printing data (third printing data) in a second memory area of the RAM 115 (storage device), the screen processing unit 117*e* that performs speculation processing in parallel with processing by the data compression unit 117*b* (second data processing unit) performs AM screen processing on the printing data (fourth printing data), and the data output unit 117*f* converts the printing data that has undergone screen processing by the screen processing unit 117*e* to final drawing data, and outputs that data as printing data (second printing data). Moreover, the screen processing unit 117*e* confirms the identification data stored in the first memory area of the RAM 115 (storage device) by the data compression unit 117*b* (second data processing unit), and in a case where the identification data is indicated as having periodicity, instructs the color conversion processing unit 117*c* to perform color conversion processing corresponding to printing by a copier on all of the remaining printing data (third printing data) that follows the printing data (third printing data) determined to have periodicity, and performs FM screen processing on the printing data that has undergone color conversion processing corresponding to printing by a copier.

As described above, by performing speculation processing of color conversion processing by the color conversion processing unit 117*c* and screen processing by the screen processing unit 117*e* in parallel with a process of analyzing printing data (third printing data) that is converted by the data processing unit 117*a* (first data processing unit) by the data compression unit 117*b* (second data processing unit), screen processing can be executed simultaneously with a process of analyzing printing data (third printing data) by the data compression unit 117*b* (second data processing unit), and color conversion processing corresponding to printing by a copier by the color conversion processing unit 117 for suppressing the occurrence of moire may be executed on the same printing data (third printing data) that has undergone color conversion processing corresponding to printing by a printer. Furthermore, in a case where the data compression unit 117*b* (second data processing unit) determines that there is periodicity in the printing data (third printing data), by the screen processing unit 117*e* instructing the color conversion unit 117*c* to perform color conversion processing on the printing data (third printing data) determined to have periodicity, and on all of the remaining printing data (third printing data) following the printing data (third printing data) determined to have periodicity so as to correspond to printing by a copier, switching from color conversion processing that corresponds to printing by a printer to color conversion processing that corresponds to printing by a copier by the color conversion processing unit 117*c* may be stopped, and color conversion processing by the color conversion processing unit 117*c* may be fixed to correspond to printing by a copier, so deterioration of performance of the image forming process may be suppressed while suppressing both the occurrence of moire and variation in image quality (appearance of the printed image).

Note that in the case where the screen processing unit 117*e* confirms the identification data in step S205 during a series of processes in steps S201 to S204, one of the following processes (1) and (2) may be executed.

(1) When the identification data correlated with the compressed one page of printing data indicates that there is no periodicity, the data compression unit 117*b* may delete the compressed one page of printing data from the first memory area of the RAM 115 after color conversion processing in step S201 is completed.

(2) When the identification data correlated with the compressed one page of printing data indicates that there is periodicity, the data compression unit 117*b* may delete the compressed one page of printing data from the first memory area of the RAM 115 after color conversion processing in step S301 is completed.

In addition, in a case where the screen processing unit 117*e* confirms the identification data in step S205 during the series of processes in steps S201 to S204, when it is indicated that the identification data correlated with the one page of compressed printing data has periodicity, the process being executed among steps S201 to S204 may be stopped, and the processing may move to step S301.

Moreover, in step S104, in a case where the data compression unit 117*b* determines that the one page of printing data converted by the data processing unit 117*a* has periodicity, the data compression unit 117*b* may instruct the processing unit (the color conversion processing unit 117*c* or the screen processing unit 117*d*) that is currently executing the processing among steps S201 to S204 to stop the processing, and processing may move to step S301.

In addition, in step S104, the data compression unit 117*b* of the image processing unit 117 may analyze the compressed printing data stored in the first memory area of the HDD 105. In this case, regardless of the identification data confirmation process in step S205, the data compression unit 117*b* may delete the compressed one page of printing data from the first memory area of the RAM 115 after the color conversion processing in step S201 is completed. Here, in step S301, the color conversion processing unit 117*c* may read the compressed one page of printing data from the first memory area of the HDD 105 and execute the color conversion processing.

In addition, in step S205, the screen processing unit 117e may confirm the identification data of the printing data in the first memory area of the HDD 105.

Moreover, in step S107, the data compression unit 117b may store the identification data in one preset first memory area of either the RAM 115 or the HDD 105. In this case, in step S205, the screen processing unit 117e confirms the identification data of the printing data of the first memory area of the storage device, either the RAM 115 or the HDD 105, in which the identification data is stored.

The invention claimed is:

1. An image forming apparatus comprising:
   an image processing unit that performs image processing on first printing data;
   a storage device for storing second printing data that has undergone image processing by the image processing unit; and
   a printer unit that performs printing based on the second printing data stored by the storage device; wherein
   the image processing unit has:
   a first data processing unit that converts the first printing data into bitmap third printing data;
   a second data processing unit that determines presence or absence of periodicity of an image corresponding to the third printing data;
   a color conversion processing unit that generates fourth printing data obtained by performing color conversion processing corresponding to printing by a printer on the third printing data by speculation processing in parallel with processing by the second data processing unit;
   a screen processing unit that performs AM screen processing on the fourth printing data by speculation processing in parallel with processing by the second data processing unit; and
   a data output unit that outputs printing data that has undergone screen processing by the screen processing unit as the second printing data to the printer unit; and
   in a case where the second data processing unit determines that the third printing data has periodicity, the screen processing unit instructs the color conversion processing unit to perform color conversion processing that corresponds to printing by a copier on the third printing data, and performs FM screen processing on printing data that has undergone the color conversion processing that corresponds to printing by a copier.

2. The image forming apparatus according to claim 1, wherein
   the second data processing unit stores identification data indicating presence or absence of periodicity of an image corresponding to the third printing data, and the third printing data in the storage device, and correlates the third printing data with the identification data; and
   the screen processing unit confirms the identification data stored in the storage device by the second data processing unit, and in a case where the identification data indicates the presence of periodicity, instructs the color conversion processing unit to perform color conversion processing that corresponds to printing by a copier on the third printing data correlated with the identification data, and performs FM screen processing on the printing data that has undergone the color conversion processing that corresponds to printing by a copier.

3. The image forming apparatus according to claim 1, wherein
   the screen processing unit
   in a case where the identification data stored in the storage device by the second data processing unit indicates there is no periodicity, deletes the third printing data from the storage device after the color conversion process corresponding to printing by a printer is completed; and
   in a case where the identification data stored in the storage device by the second data processing unit indicates there is periodicity, deletes the third printing data from the storage device after the color conversion process corresponding to printing by a copier is completed.

4. The image forming apparatus according to claim 1, wherein
   the screen processing unit, in a case where the second data processing unit determines there is periodicity in the third printing data, instructs the color conversion processing unit to perform color conversion processing on the third printing data determined to have periodicity, and on all of the remaining third printing data following the third printing data determined to have periodicity so as to correspond to printing by a copier.

5. The image forming apparatus according to claim 4, wherein
   the screen processing unit
   in a case where the second data processing unit determines there is periodicity in a first page of the third printing data, instructs the color conversion processing unit to perform color conversion processing on the third printing data determined to have periodicity, and on all of the remaining third printing data following the first page of the third printing data so as to correspond to printing by a copier, and
   in a case where the second data processing unit determines there is periodicity in the second or the following page of the third printing data, instructs the color conversion processing unit to perform color conversion processing on the third printing data determined to have periodicity so as to correspond to printing by a copier.

6. The image forming apparatus according to claim 4, wherein
   the screen processing unit
   in a case where the second data processing unit determines that the third printing data has periodicity, instructs the second data processing unit to stop the process of determining the presence or absence of periodicity of an image for all of the remaining third printing data that follows the third printing data determined to have periodicity; and
   performs FM screen processing on printing data that has undergone the color conversion processing that corresponds to printing by a copier.

7. An image forming method executed by a computer that controls an image forming apparatus and having:
   a step of an image processing unit performing image processing on first printing data;
   a step of a storage device storing second printing data that has undergone image processing by the image processing unit; and
   a step of a printer unit performing printing based on the second printing data stored by the storage device; wherein
   the image processing unit further has:
   a step of a first data processing unit converting the first printing data to bitmap third printing data;
   a step of a second data processing unit determining presence or absence of periodicity of an image corresponding to the third printing data;
   a step of a color conversion processing unit that performs speculation processing in parallel with processing by the second data processing unit generating fourth printing data obtained by performing color conversion processing corresponding to printing by a printer on the third printing data;

a step of a screen processing unit that performs speculation processing in parallel with processing by the second data processing unit performing AM screen processing on the fourth printing data; and a step of a data output unit outputting printing data that has undergone screen processing by the screen processing unit as the second printing data to the printer unit; wherein the screen processing unit, in a case where the second data processing unit determines that the third printing data has periodicity, instructs the color conversion processing unit to perform color conversion processing that corresponds to printing by a copier on the third printing data, and performs FM screen processing on printing data that has undergone the color conversion processing that corresponds to printing by a copier.

8. The image forming method according to claim 7, further having a step of the color conversion processing unit, by performing speculation processing in parallel with processing by the second data processing unit, generating fourth printing data obtained by performing color conversion processing corresponding to printing by a printer on the third printing data;

a step of the screen processing unit, by performing speculation processing in parallel with processing by the second data processing unit, performing AM screen processing on the fourth printing data; and a step of the data output unit outputting printing data that has undergone screen processing by the screen processing unit as the second printing data to the printer unit; wherein the screen processing unit, in a case where the second data processing unit determines there is periodicity in the third printing data, instructs the color conversion processing unit to perform color conversion processing on the third printing data determined to have periodicity, and on all of the remaining third printing data following the third printing data determined to have periodicity so as to correspond to printing by a copier.

* * * * *